United States Patent [19]
Bennett et al.

[11] Patent Number: 6,063,277
[45] Date of Patent: May 16, 2000

[54] FIBER-REINFORCED, COMPOSITE BODY CONTACTORS

[75] Inventors: Jonathan P. Bennett, Fort Mill, S.C.;
William K. Jackson, Charlotte, N.C.;
Charles J. Runkle, Charlotte, N.C.;
Martin J. Weinstein, Charlotte, N.C.

[73] Assignee: Celgard Inc., Charlotte, N.C.

[21] Appl. No.: 09/041,577

[22] Filed: Mar. 13, 1998

[51] Int. Cl.[7] .............................. B01D 63/02; F17C 1/02
[52] U.S. Cl. ................... 210/321.78; 210/500.23; 220/586; 428/36.3
[58] Field of Search ............ 210/497.1, 500.23, 210/500.27, 321.78; 220/586; 428/36.3; 156/172

[56] References Cited

U.S. PATENT DOCUMENTS

| | | | |
|---|---|---|---|
| 3,701,428 | 10/1972 | Lesh | 210/170 |
| 4,194,745 | 3/1980 | McDougal | 277/27 |
| 4,767,017 | 8/1988 | Logullo, Sr. et al. | 220/3 |
| 5,046,638 | 9/1991 | Wolf | 220/679 |
| 5,227,063 | 7/1993 | Langerak et al. | 210/321.78 |
| 5,264,171 | 11/1993 | Prasad et al. | 264/103 |
| 5,284,584 | 2/1994 | Huang et al. | 210/321.61 |
| 5,352,361 | 10/1994 | Prasad et al. | 210/321.81 |
| 5,427,741 | 6/1995 | Bennett | 428/36.3 |
| 5,520,886 | 5/1996 | Bennett et al. | 422/102 |

FOREIGN PATENT DOCUMENTS 294184  12/1988  European Pat. Off. .

*Primary Examiner*—David A. Simmons
*Assistant Examiner*—Frank M. Lawrence
*Attorney, Agent, or Firm*—Robert H. Hammer, III

[57] ABSTRACT

The present invention is directed to a contactor having a microporous membrane and a shell surrounding the membrane. A shell has a fluoropolymer inner surface and a composite structural body. The fluoropolymer inner surface is integrated into the composite structural body.

7 Claims, 4 Drawing Sheets

FIBER-REINFORCED, COMPOSITE BODY CONTACTORS

FIELD OF THE INVENTION

This invention is directed to a contactor having a fiber-reinforced, composite body with a fluoropolymer inner surface.

DETAILED DESCRIPTION OF THE INVENTION

A contactor is a mass transfer device that may be used to remove a material from a fluid stream or to add a material to a fluid stream. For example, in the manufacture of, integrated circuits (ICs), there is a need for ultrapure water to rinse their surface. Ultrapure water, as used herein, refers to water that has very little dissolved gases (e.g., less than 10 ppb$O_2$). Dissolved gases, even in minute amounts, can etch the surface of the IC, and thereby destroy it. Contactors, which are used for the purification (or degassing) of water for this application, typically have stainless steel shells. Ultrapure water, coming into contact with the stainless steel, can be contaminated, via leaching or other transport phenomena, by contact with stainless steel. Furthermore, the stainless steel is very heavy and expensive. Accordingly, there is a need for a contamination resistant, light-weight contactor which is relatively inexpensive.

Filament wound pressure vessels are known. See, U.S. Pat. No. 4,767,017. Metal pressure vessels having a discrete fluoropolymer liner are known. See, U.S. Pat. No. 5,046,638. Filament wound pressure vessels having a fluoropolymer inner surface are known for use in microwave heating. See, U.S. Pat. Nos. 5,427,741 and 5,520,886.

SUMMARY OF THE INVENTION

The present invention is directed to a contactor having a microporous membrane and a shell surrounding the membrane. The shell has a fluoropolymer inner surface and a composite structural body. The fluoropolymer inner surface is integrated into the composite structural body.

The instant invention, also, includes a method of making a fiber-reinforced composite contactor having a fluoropolymer inner surface integrated into the body by the steps of:

providing a mandrel;

laying a fluoropolymer tape over the mandrel;

laying a structural fiber over the tape;

applying a shrink-wrap tape over the fiber thereby forming a first body;

applying heat to the first body whereby the fiber becomes integrated into at least a portion of the fluoropolymer tape;

removing the shrink-wrap tape from the first body;

applying a matrix resin to the first body; and applying a second structural fiber to the resin;

whereby a fiber-reinforced, composite body contactor is formed.

DESCRIPTION OF THE DRAWINGS

For the purpose of illustrating the invention, there is shown in the drawings a form which is presently preferred; it being understood, however, that this invention is not limited to the precise arrangements and instrumentalitites shown.

DETAILED DESCRIPTION OF THE INVENTION

Figure 1:
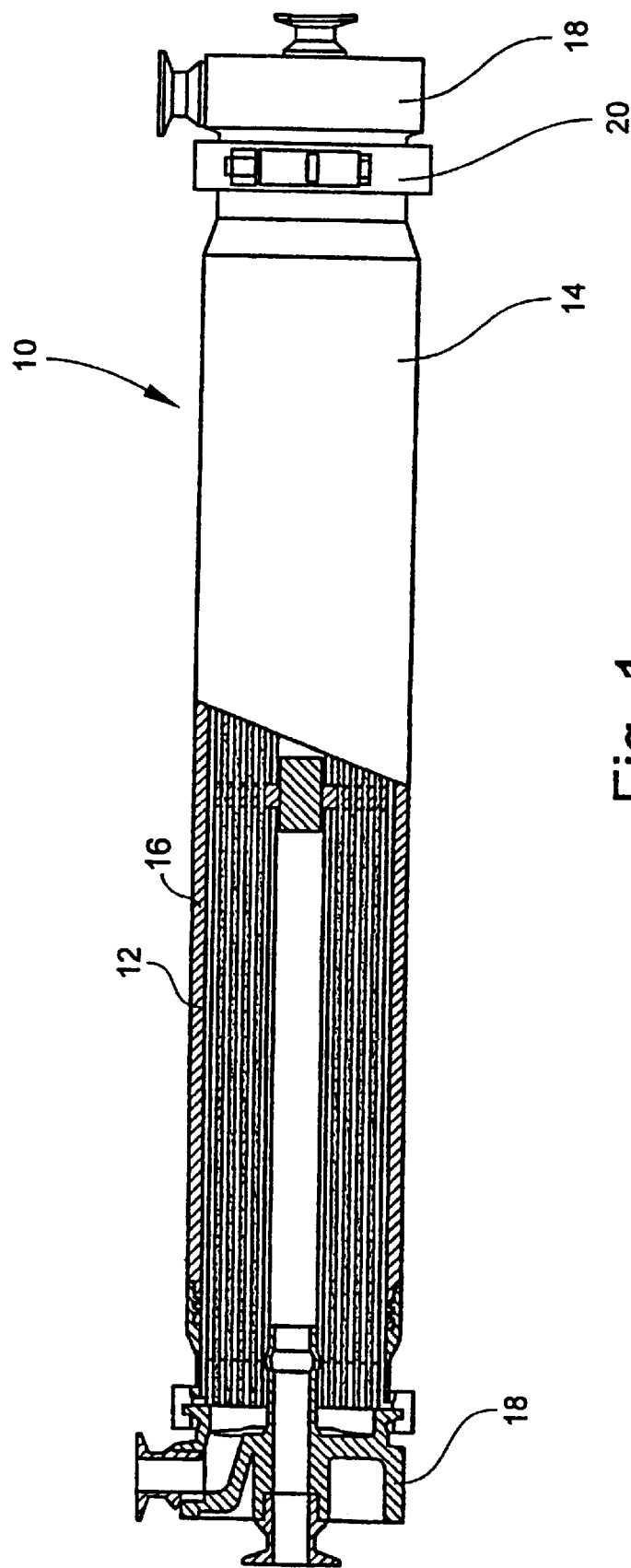
FIG. 1 is a plan view of a contactor, parts broken away for clarity.

Referring to the drawings wherein like numerals indicate like elements, there is shown, in FIG. 1, a contactor 10. Contactor 10 comprises microporous membrane 12 and shell 14. Microporous membrane 12 is preferably a plurality of microporous hollow fibers and more preferably those fibers are woven or knitted into a mat. Membrane 12 is preferably made of a polyolefin material. Suitable hollow fibers are commercially available from CELGARD LLC of Charlotte N.C. Shell 14 comprises main shell 16, end cap 18, and clamp 20. For example, see U.S. Pat. Nos. 5,264,171; 5,284,584; and 5,352,361 and U.S. application Ser. No. 08/719,668 filed Sep. 25, 1996, incorporated herein by reference.

Figure 2:
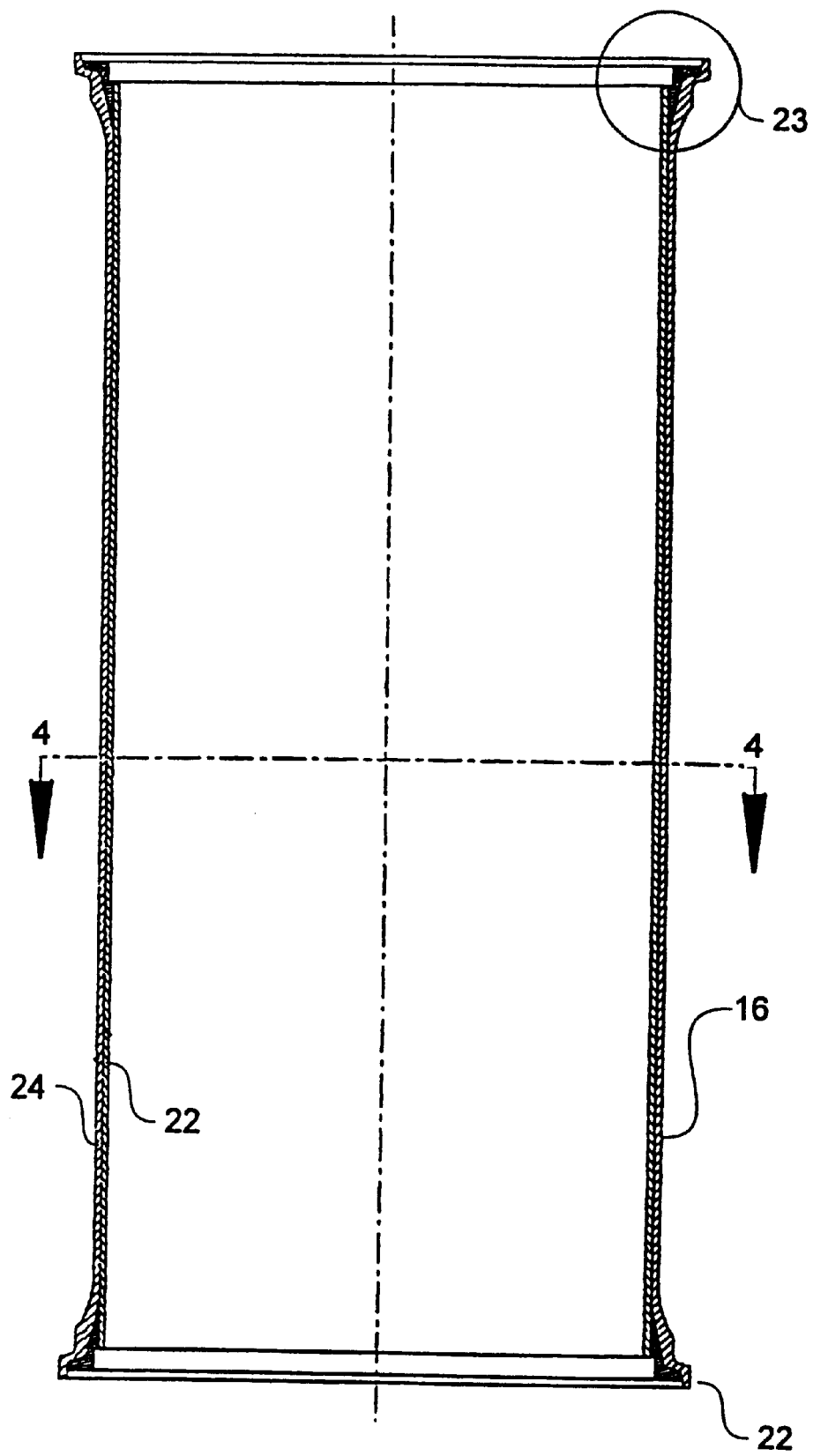
FIG. 2 is a cross-sectional view of shell made according to the present invention.
Figure 3:
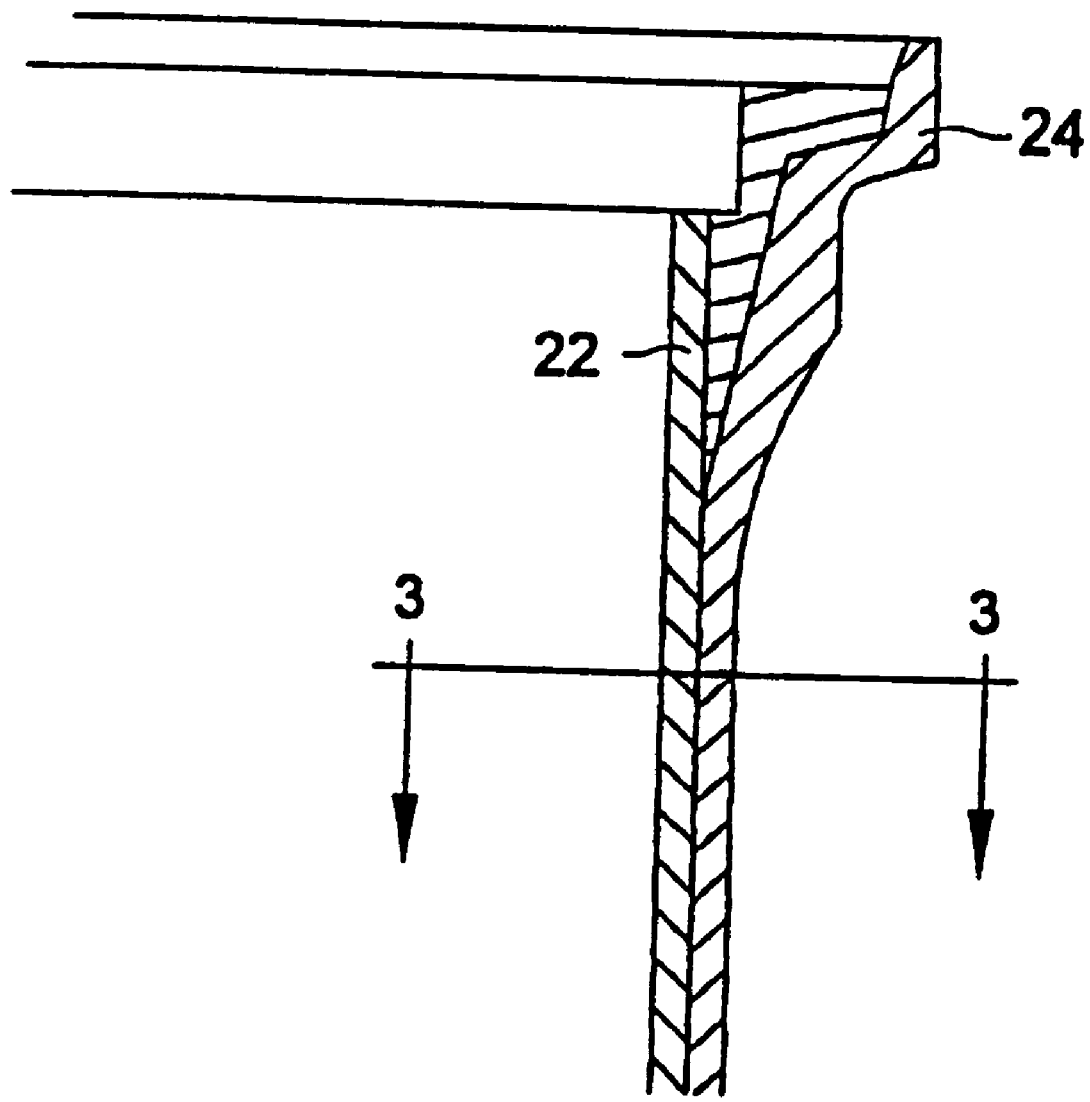
FIG. 3 is an enlarged view of the circled portion of FIG. 2.

Referring to FIGS. 2 and 3, main shell 16 is preferably tubular and maybe flanged. Main shell 16 comprises a fluoropolymer inner surface 22 and a composite structural body 24.

Figure 4:
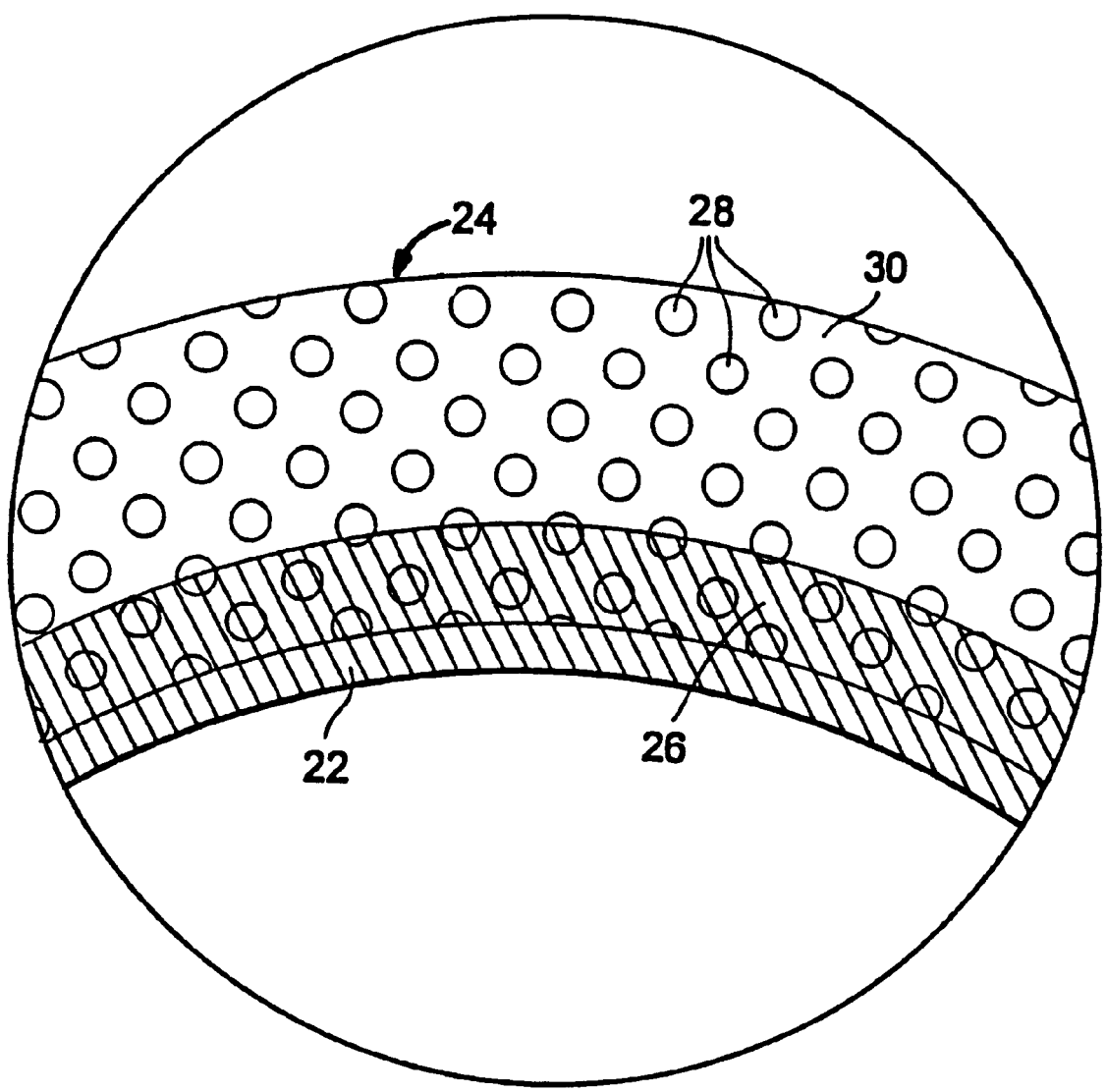
FIG. 4 is a schematic illustration of how the fluoropolymer is integrated into the composite body.

Referring to FIG. 4, there is shown fluoropolymer inner surface 22, composite structural body 24, and an integrated or interfacial zone 26. The composite structural body 24 consists of a plurality of structural fibers 28 and a matrix resin 30. Integrated zone 26 illustrates fibers 28 embedded within the fluoropolymer. Integrated zone 26 facilitates bonding or interconnection of the fluoropolymer 22 to body 24. Zone 26 is necessary because the fluoropolymer does not stick well to other materials. The integrated zones 26 reduces the possibility that the fluoropolymer inner surface 22 will detach or delaminate from body 24.

Fluoropolymer (or fluorocarbon polymer) refers to generally a straight backbone of carbon atoms symmetrically surrounded by fluorine atoms. Exemplary fluoropolymers include polyester fluoroethylene, polymers of chlorotrifluoroethylene, fluorinated ethylene-propylene polymers, polyvinylidene fluoride, and hexafluoropropylene. The preferred fluoropolymer is polyvinylidene fluoride (PVDF).

Composite structural body refers to any structure made by bonding two or more different materials. For example, those different materials may be matrix resin and structural fibers.

Matrix resins refer to the component of a composite structure in which the fibers or filler materials are embedded, and which transfers stresses to them, prevents fibers from buckling, and protects their surfaces. Generally, matrix resins are thermosetting (e.g., epoxies) or thermoplastic. In the present invention, thermosets are preferred.

Structural fibers refer to the material embedded in matrix resin of the composite structure, and which absorbs the stresses in the composite structure. Exemplary fibers include glass fibers, carbon fibers, liquid crystalline polymer (LCP) fibers, ultra high molecular weight polyethylene, and the like. Glass fibers are preferred.

In manufacture, main shell 16 is built on a mandrel. In one method, fluoropolymer tape is wound over the mandrel. A structural fiber mat (e.g., a fabric) is overlaid on the fluoropolymer tape. Thereafter, a heat-shrinkable sleeve is laid overtop the structural fibers. Heat is then applied causing the heat-shrinkable sleeve to compress the structural fibers into molten or semi-molten fluoropolymer, thereby creating, in part, inner surface 26. Thereafter, the body is cooled and the heat-shrinkable sleeve is removed. Matrix resin 30 is applied over the body and additional structural fibers are laid in the resin. After the resin is cured the fabrication of the main shell is complete, except, perhaps for finishing.

In another method (for a 10 inch diameter contactor), a fluoropolymer tape (e.g. KYNHR® PVDF commercially available from Elf-Atochem, Inc. of Philadelphia, Pa.) is wound on the mandrel (3 layers is preferred). A dry glass braid (e.g.,Port No. M24L900R commercially available from A&P Technology of Covington, Ky.) is wound over the fluoropolymer tape. A glass/epoxy tow preg (e.g., EGLASS 450 with 25% resin by weight commercially available from Thiokol's TCR Composites Division of Thiokol Corporation of Corrinne, Utah) is wound over the dry glass braid (8 layers at alternating wrap angles is preferred). optionally, the edges may be built up to create flanges, as is well known. A final towpreg is overwrapped thereover. A polyimide shrink tape (e.g., 2 mil by 1 inch commercially available from Dunstone Company of Charlotte, N.C.) is over wrapped thereover. (3 layers is preferred). Curing is accomplished by ramping the temperature at 5° F./minute; dwelling at 395° F. for 5 minutes; and then slowly cooling to ambient temperature. (total heating time is about 70 minutes). Thereafter, the part is removed and finished.

The present invention may be embodied in another significant forms without the parting from the spirit or central attributes thereof, and accordingly, a reference should be made to the appended claims rather than to the foregoing specification, as indicated the scope of the invention. These claims are in the file there are two claims one for a contactor and one for a method.

We claim:
1. A contactor comprising:
   a microporous membrane and
   a shell surrounding said membrane, said shell having a fluoropolymer inner surface and a composite structural body including structural fibers, said fibers being embedded within said surface.
2. The contactor of claim 1 wherein said membrane further comprises a plurality of microporous hollow fibers.
3. The contactor of claim 1 wherein said fluoropolymer is polyvinylidene fluoride.
4. The contactor of claim 1 wherein said body comprises a matrix resin and a plurality of structural fibers.
5. The contactor of claim 4 wherein said resin is a thermoset.
6. The contactor of claim 5 wherein said thermoset is epoxy.
7. The contactor of claim 4 wherein said fiber is a glass fiber.

* * * * *